(12) United States Patent
Lee et al.

(10) Patent No.: US 9,648,546 B2
(45) Date of Patent: May 9, 2017

(54) IMAGE RECORDING DEVICE FOR VEHICLE WITH DUAL WI-FI ACCESS FUNCTION AND IMAGE SHARING SYSTEM USING THE SAME

(71) Applicant: PITTASOFT CO., LTD., Seoul (KR)

(72) Inventors: Jake Lee, Seoul (KR); Hyun Min Hur, Seoul (KR); Tae Yun Lee, Seoul (KR); Hyun Chul Im, Seoul (KR); Hyun Chul Kim, Seoul (KR)

(73) Assignee: PITTASOFT CO., LTD., Seoul (KR)

( * ) Notice: Subject to any disclaimer, the term of this patent is extended or adjusted under 35 U.S.C. 154(b) by 0 days.

(21) Appl. No.: 15/162,962

(22) Filed: May 24, 2016

(65) Prior Publication Data

US 2017/0021875 A1    Jan. 26, 2017

Related U.S. Application Data

(63) Continuation of application No. 14/882,759, filed on Oct. 14, 2015.

(30) Foreign Application Priority Data

Jul. 22, 2015    (KR) .................... 10-2015-0103656

(51) Int. Cl.
*H04N 5/77*    (2006.01)
*H04N 9/80*    (2006.01)
(Continued)

(52) U.S. Cl.
CPC .......... *H04W 48/08* (2013.01); *G07C 5/0866* (2013.01); *H04N 5/77* (2013.01);
(Continued)

(58) Field of Classification Search
USPC ................................................ 386/200–234
See application file for complete search history.

(56) References Cited

U.S. PATENT DOCUMENTS

2003/0135304 A1*  7/2003  Sroub ................... G06Q 10/08
                                                              701/1
2005/0216193 A1*  9/2005  Dorfman ........... G06F 17/30241
                                                              701/400
(Continued)

FOREIGN PATENT DOCUMENTS

KR    10-2013-0030607    3/2013
KR    1020130057265    5/2013
(Continued)

OTHER PUBLICATIONS

U.S. Appl. No. 14/882,759, filed Oct. 2015, Lee et al.
(Continued)

*Primary Examiner* — Hung Dang
(74) *Attorney, Agent, or Firm* — Nixon & Vanderhye P.C.

(57) ABSTRACT

The image recording device for a vehicle with dual Wi-Fi access function, includes: a imaging unit; a communicating module having an AP function unit which is adapted to function as an AP of a Wi-Fi communication and a STA function unit which is adapted to function as a STATION of a Wi-Fi communication, thereby allowing for access to a peripheral AP; a storage unit for storing the image information from the imaging unit; and a control unit. Wherein the control unit is configured to allow a specific smart phone as STATION to access the AP function unit, or selectively to allow the STA function unit to access a remote cloud server when it as STATION accesses a peripheral AP; to transfer an image information being imaged in real-time or an image information stored in the storage unit to the smart phone by using the AP function unit or to the cloud server via the peripheral AP by using the STA function unit; and to control an operation status thereof according to a control information received from the smart phone by using the AP function unit or from the cloud server by using the STA function unit.

8 Claims, 3 Drawing Sheets

(51) Int. Cl.

| | |
|---|---|
| *H04W 48/08* | (2009.01) |
| *G07C 5/08* | (2006.01) |
| *H04N 21/2743* | (2011.01) |
| *H04N 21/258* | (2011.01) |
| *H04W 88/08* | (2009.01) |
| *H04N 21/414* | (2011.01) |
| *H04N 21/422* | (2011.01) |
| *H04N 21/4223* | (2011.01) |

(52) U.S. Cl.
CPC ... *H04N 21/25816* (2013.01); *H04N 21/2743* (2013.01); *H04N 21/41422* (2013.01); *H04N 21/4223* (2013.01); *H04N 21/42202* (2013.01); *H04W 88/08* (2013.01)

(56) References Cited

U.S. PATENT DOCUMENTS

| | | | | |
|---|---|---|---|---|
| 2007/0198318 A1* | 8/2007 | Ikeya | ............ | G06Q 40/00 709/223 |
| 2008/0309762 A1* | 12/2008 | Howard | ............ | G07C 5/0891 348/148 |
| 2010/0211259 A1* | 8/2010 | McClellan | ............ | G07C 5/0816 701/31.4 |
| 2012/0242473 A1* | 9/2012 | Choi | ............ | B60W 50/14 340/441 |
| 2013/0235814 A1* | 9/2013 | Wietfeldt | ............ | H04W 16/14 370/329 |
| 2013/0315445 A1* | 11/2013 | Schlieski | ............ | G06F 17/30247 382/103 |
| 2014/0036705 A1* | 2/2014 | Ma | ............ | H04W 28/0231 370/252 |
| 2015/0197205 A1* | 7/2015 | Xiong | ............ | B60R 16/037 701/49 |
| 2015/0365981 A1* | 12/2015 | Thanayankizil | ...... | H04W 4/008 455/41.2 |

FOREIGN PATENT DOCUMENTS

| | | |
|---|---|---|
| KR | 1020130103876 | 9/2013 |
| KR | 101353047 | 1/2014 |
| KR | 101356299 | 1/2014 |
| KR | 101477913 | 12/2014 |

OTHER PUBLICATIONS

Office Action dated Aug. 1, 2016 mailed in U.S. Appl. No. 14/882,759 (Lee et al., "Image Recording Device for Vehicle With Dual Wi-Fi Access Function and Image Sharing System Using the Same").

\* cited by examiner

IMAGE RECORDING DEVICE FOR VEHICLE WITH DUAL WI-FI ACCESS FUNCTION AND IMAGE SHARING SYSTEM USING THE SAME

CROSS-REFERENCE TO RELATED APPLICATION

This application is a continuation of application Ser. No. 14/882,759 (pending), filed Oct. 14, 2015, which claims priority to and the benefit of Korean Patent Application No. 10-2015-0103656, filed on Jul. 22, 2015, the disclosure of which is incorporated herein by reference in its entirety.

BACKGROUND

1. Field of the Invention

The present invention relates to an image recording device for a vehicle with a Wi-Fi function by which the communication can be established in various ways and an image sharing system using the image recording device.

2. Discussion of Related Art

An image recording device for a vehicle, i.e., a black box for a vehicle is also referred to as EDR (Event Data Recorder) and a lot of image recording devices mainly take the form of camera-type product. The black box is mounted chiefly close to a room mirror inside the vehicle or on a dash board and is used mainly for deciding which is right or wrong at the time of a traffic accident by recording a image motion picture in front of the vehicle.

A black box is also capable of imaging the rear or both sides of the vehicle as well as the front thereof by mounting two or more cameras inside the vehicle. In addition, there have appeared recently a black box capable of recording the sound coming from the inside and outside of the vehicle and a black box capable of imaging even the inside of the vehicle.

A imaging device mounted at such a black box for the vehicle stores an image data being imaged in real-time in its own storage device such as a portable memory card.

Meanwhile. KR patent application publication No. 10-2013-0030607 entitled 'Mobile black box control system and Mobile black box control method' discloses that a black box may perform the wireless internet communication function using a Wi-Fi connection, etc., and has the short range wireless communication function using a Bluetooth or Zigbee wireless module, etc., and the RF (Radio Frequency) transmitting/receiving function.

With this feature, a black box is adapted to be controlled remotely by a mobile device.

However, since the black box of the above conventional technology has to include all of a unit for supporting a wireless internet communication, a unit for supporting a short range wireless communication and a unit for supporting an RF transmitting/receiving communication, there are drawbacks such as a complicated design, a difficult usage and a high price.

SUMMARY OF THE INVENTION

To solve the above described problems, one object of the present invention is to provide an image recording device for a vehicle which may support a wireless communication in various ways using only one Wi-Fi communication module.

Further, another object of the present invention is to provide various additional useful functions with high availability by means of the image recording device of the vehicle described above.

As described above, since the image recording device for the vehicle with a dual Wi-Fi access function s configured to operate a Wi-Fi communication module in an AP mode and a STATION mode at the same time or alternatively according to the present invention, it may be implemented such that a smart phone user would have access to the image recording device directly or via a peripheral AP (Access Point) and a cloud server.

Further, since the image being image recording device and the GPS (global positioning system) position and speed at the time of imaging may be synchronized; exact information regarding a subsequent vehicle operation may be obtained.

Further, by supporting the communication via cloud server, a user may control remotely an image recording device and may communicate a remote voice with an image recording device.

Further, when an impact or specific situation is sensed from a vehicle, an image recording device may detect the impact detection or specific situation to push to a remote smart phone and a user may then check the pushed event and may check with the smart phone in real-time the image being imaged by the image recording device.

In addition, according to an image sharing system using the image recording device, a user may check in real-time images being imaged by image recording devices of other vehicles by accessing a cloud server and thereby may obtain a real-time traffic information.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Exemplary embodiments of an image recording device for a vehicle with a dual Wi-Fi function according to the present invention will be described in detail below with reference to the accompanying drawings.

Figure 1:
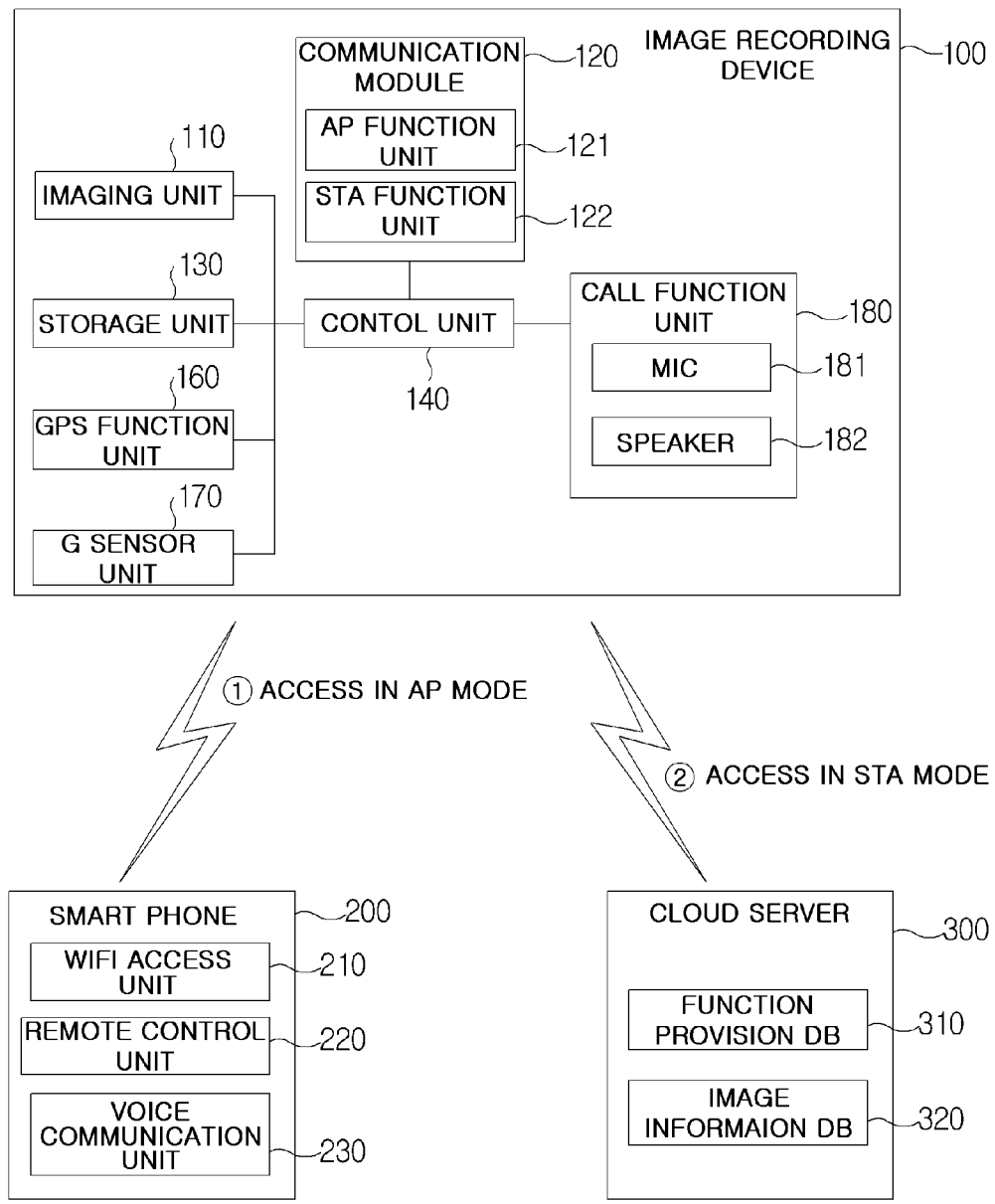
FIG. 1 is a schematic block diagram illustrating the configuration of an image recording device for a vehicle with a dual Wi-Fi access function according to an embodiment of the present invention.

FIG. 1 is a block diagram schematically illustrating the configuration of an image recording device with a dual Wi-Fi access function, according to one embodiment of the present invention. Referring to the drawing, an image recording device for a vehicle 100 may include an imaging unit 110, a communicating module 120, a storage unit 130 and a control unit 140. Meanwhile, an image recording device for a vehicle according to another embodiment may further include a GPS function unit 160, a G-sensor unit 170 and a call function unit 180.

The imaging unit 110 includes a camera and creates an image information on the front to which the camera points.

The communicating module 120 allows the image recording device 100 to be connected directly to a user's smart phone 200 with a Wi-Fi communication or to have access to a cloud server 200 via an Access Point (AP) detected from the surroundings. This communicating module 120 includes an AP function unit 121 which supports an AP mode which allows the communicating unit 120 to function as an AP and allows a user's smart phone 200 to directly have access to the communicating unit by setting the smart phone 200 as a STATION. In addition, the communicating module 120 includes an STA function unit 122 supporting an STA mode which allows the communicating unit to have access to an internet network by setting the communicating module as STATION and by allowing the communicating module to have access an AP detected from the surroundings.

In particular, the communicating module 120 may operate the AP function unit 121 and the STA function unit 122, simultaneously or alternately. As a result, the image recording device 100 may be controlled by a user's smart phone 200 in an AP mode and by the cloud server 300 by having access to the cloud server 300 via another AP, simultaneously or alternately.

The storage unit 130 may be a portable storage device or an embedded storage device and is configured to store the image information being imaged by the imaging unit 110. And the storage unit 130 may be configured to store control information for controlling various functions of the image recording device itself or the other software managed in an image recording device.

The control unit 140 may control various operations of the image recording device 100.

(1) First, by operating the image recording device in an AP mode using the AP function unit 121, a specific smart phone, i.e., a user's smart phone may be set as STATION and the connection of the smart phone to the image recording device is allowed. Further, by operating the image recording device in an STA mode using the STA function unit 122 simultaneously or alternately with the execution of the AP mode, the image recording device functions as STATION and requests a peripheral AP for access thereto. If the image recording device 100 has access to the peripheral AP, it may be connected to an internet network via the peripheral AP and may have access to the remote cloud server 300 via the internet network.

(2) Furthermore, the control unit 140 is configured to store the image information created in real-time into the storage unit 130. If the image recording device 100 is accessed to a user's smart phone 200 or the cloud server 300 via the communicating module 120, the image recording device 100 may transfer the real-time image information or the image information previously imaged and stored in the storage unit to designated destinations, according to an inputted control instruction or a reserved control instruction.

(3) In addition, the control unit may change its operation state by receiving any control information from a user's smart phone 200 or the cloud server 300 which is accessed via the communicating module 120.

The control information may include, for example a request regarding whether to transmit in real-time image information being imaged or whether to read out stored image information and then transmit the readout information. It may also include setting information related with various functions for image recording device 100 set by a user's smart phone 200, etc. In addition, the control information may include the accessed AP and the access priority in the Station (STA) mode, access SSID (Service Set Identifier) and PW (Password) for using any AP, inherent device ID and PW for having access to the cloud server 300, etc., and all these may be set by a user's smart phone 200 or the cloud server 300.

In this way, the image recording device for the vehicle 100 which supports a dual Wi-Fi access fu (i.e., AP mode and STA mode) by the communicating module 120 having the AP function unit 121 and the STA function unit 122, may be connected directly to a user's smart phone 200 in AP mode through Wi-Fi network and may receive a control information as an input from said smart phone, in case a user is at a short distance away from the image recording device. And said image recording device may receive a control information as an input from the cloud server 300 within an internet network in STA mode, in case a user is at a long distance away from the image recording device.

Since a user may order a desired direction to his/her image recording device 100 by having access to the cloud server 300, the control from the cloud server 300 may also be regarded as the control from a user.

Meanwhile, a GPS function unit 160 which may be included in an image recording device for a vehicle according to another embodiment of the present invention may detect latitude and longitude coordinates, a moving speed, etc., of a vehicle, by having access to a positioning system using a satellite and then calculating a position information of the GPS function unit.

The position information created in the GPS function unit 160 may be stored in storage unit 130 in real-time and it may be used for calculating a moving path and a moving speed of a vehicle.

Meanwhile, the control unit 140 may encode real-time image information being imaged by the imaging unit 110 and real-time position information calculated in the GPS function unit 160 and then store it in the storage unit 130 or transmit it to a user's smart phone 200 or the cloud server 300 via the communicating module 120.

At this time, when the smart phone receives in real time the image information and displays it or when the cloud server 300 or any smart phone 200 having access to the cloud server 300 via an internet displays the image information which the image recording device 100 transmits in real-time, a complete real-time display is impossible. That is why the time required to encode/decode the image information and the data transfer rate (or the data transfer paths) via a network are variable. That is, display will be made with certain time delay from the real shooting time.

In contrast, since the position information by the GPS function unit 160 is small in an amount of information and the encoding/decoding thereof is simple, even if it is transmitted in AP mode or STA mode, it may be generally transmitted faster than image information. Moreover the position information may be received stably regardless of the network transfer rate.

Therefore, when the image recording device transmits the image information created in real-time and the GPS information calculated in real-time to a remote device (to a user's smart phone in AP mode or to the cloud server in STA mode), if the image recording device sends them on the respective different channels, the respective information will reach a destination (i.e., a smart phone) at different time point, i.e., with a time difference. Although the respective information are transmitted with adding a time stamp including time information, it is considerably difficult to display the image information and OPS information simultaneously, with the time information being synchronized.

If the image information and GPS information received at the destination are displayed immediately when they are received, the image being now displayed and the current position of a vehicle will not be consistent with each other due to arrival time difference.

Thus, the image recording device 100 adopts a method of synchronizing the position information on the basis of the time when the image information is imaged in real-time. That is, a method of adding the position information to any section of data stream for transferring the image information is utilized.

According to this transfer method, when decoding the image information, the position information be sequentially extracted. If the position information being extracted is indicated on a digital-map while displaying the decoded image information, then the image and the position being exactly consistent may be made without a further time synchronizing process.

Herein, the image information is imaged at high speed, for example at the rate of 10-30 frames per second. Thus, a millisecond unit of accurate temporal information is recorded on the image information.

However, the position information according to the GPS is obtained at low speed, for example at the rate of about one time per second.

Therefore, the present invention has the feature that a method of synchronizing the time of the position information on the basis of accurate temporal information of the image information is adopted. That is, the temporal information of image information corresponding to the time of the created position information is selected and the encoding is performed in such a manner that the position information is inserted to the image information.

Meanwhile, a G-sensor unit 170 includes an acceleration sensor capable of measuring acceleration(s) in one to three axis directions.

By this acceleration sensor, the image recording device 100 may sense an impact applied to a vehicle. For example, if an acceleration more than a predefined reference is sensed from an acceleration sensor in a parked vehicle, this may be regarded as the fact that an impact was applied to a vehicle or an illegal try happened, for example, to forcefully open the door of a vehicle and thus, in this case, a user is notified in various manners.

For example, if the impact is sensed when the image recording device 100 maintains an access to the cloud server 300 in STA mode, an impact detection information is created winch includes at least one of the temporal information indicating a corresponding time, the magnitude of sensed impact (or acceleration), the applied direction of impact, and the image information imaged and stored from a predefined time prior to impact-sensing to a predefined time thereafter. The control unit 140 sends the created impact detection information to a preset destination (for example, a smart phone designated to a user ID in a cloud server)

According to this configuration, a user may notice immediately that the impact happened in his/her vehicle; check the image imaged at the time of the impact through the cloud server; and thereby find the attacker or respond by recognizing rapidly the current state of the surroundings of a vehicle.

Meanwhile, an image recording device of a vehicle according to another embodiment may further include a call function unit 180. The call function unit 180 may support a voice communication with a user smart phone 200 having access to the cloud server 300.

To this end, the call function unit 180 may include a microphone 181 and a speaker 182. The microphone 181 converts a voice collected from the surroundings to a voice input signal.

The speaker 182 converts a voice output signal into an audible voice and outputs it.

When a voice signal for voice communication is inputted through the cloud server, the control unit 140 may detect a specific signal or instruction contained in the foremost end and/or the rearmost end of the voice signal. Depending on the detection of control unit 140, control unit 140 may automatically turn on or off the microphone 181. In addition, when the microphone 181 is now switching on or off, a specific beep sound may be outputted via the speaker 182 to that a user may recognize an operation situation of the microphone 181.

Meanwhile, the image recording device has a predefined operating switch at one side thereof and a user may also turn on/off the operation of the microphone 181 by manipulating the operating switch.

First, a smart phone user may have access to the cloud server 300 by means of the smart phone 200, then select any image recording device 100 accessed to the cloud server 300 and input any voice through the microphone after driving an application for voice communication. The application may cut and record the voice of a user in real-time and consecutively per a certain time (for example, 0.1 or 1 second, etc.) and then encodes it as a digital voice output signal per said time. At this time, the voice output signal may include temporal information. At the foremost end and/or the rearmost end of the encoded voice output signal may be included a specific signal (for example beep sound) or an instruction for turning on or off the microphone of the image recording device. The voice output signal encoded in this way is transferred to the cloud server 300 in the order of encoding, and the cloud server 300 transfers said voice output signal to a designated image recording device 100.

If the image recording device 100 receives the voice output signal, it decodes the voice output signal, outputs a beep sound (the very first voice output signal may include a beep sound. At this time, a control unit may turn off a microphone) and outputs the voice through speaker 182. The image recording device allows the voice to be output consecutively by checking temporal information included in the voice output signal received continually. And, if a beep sound is detected at the rearmost end of a voice output signal, the beep sound is outputted via the speaker and a voice call function is terminated and the microphone turns on by the control of a microphone control unit.

A user of the image recording device 100 may listen to said voice (the voice by the voice output signal) around the image recording device 100, and if a user of a remote smart phone listens to a beep sound following the ending of a voice input, then the user of the image recording device may input a desired voice.

The control unit 140 detects the ending when a voice input from a user of the image recording device starts (or detects an operation of an switch which turns off the microphone); creates a voice input signal by dividing the inputted voice per said time; and then transfers the voice input signal to the cloud server 300. The cloud server 300 transfers the transferred voice input signal a destination smart phone 200.

Here, an application of the smart phone 200 also may offer a soft switch (not shown), etc., for turning on/off of the operation of the microphone provided to the smart phone 200.

According to a voice call function between this call function unit 180 and the smart phone 200, a user of the image recording device may determine exactly the ending time of the other party's talk by listening to a beep sound. That is, since both parties speak to each other alternately with microphone turned on based on beep sound, it can be avoided that each party cannot understand what the other party speaks due to the overlap of a user's speaking and the other party's speaking, or a user's speaking cannot be transferred due to voice inputted with microphone turned off.

In addition, since a user of the image recording device is more likely to drive a vehicle, the operation of manually turning on/off the microphone provided to the image recording device may be very dangerous. However, since the control unit 140 in the present invention may automatically turn on/off the microphone by sensing a beep sound, it serves for safe driving.

Meanwhile, the smart phone 200 of a user, as STATION, may have access to the image recording device 100 operating in AP mode or may have access to the image recording device 100 operating in STATION mode by having access to the cloud server 300.

This smart phone 200 may include a Wi-Fi access unit 210; a remote control function unit 220; a voice communication function unit 230. Each function unit may be implemented by a software application operating in a smart phone.

The Wi-Fi access unit 210 provides for the function capable of having access to the cloud server 300 after access to an internet in a Wi-Fi manner and of having access to a remote image recording device 100 via the cloud server 300. Or, the Wi-Fi access unit 210 provides for the function capable of directly having access to the image recording device 100 operating in AP mode.

The remote control function unit 220 provides for the function capable of changing the setting for various operations of the image recording device 100 and capable of controlling remotely the operating state of the image recording device 100. As an example, there are enumerated the function of changing SSID and/or PW for access used in the AP function unit 121 or the STA function unit 122; the function of requesting the transfer of the image information from an accessed image recording device 100; and the function of changing detailed settings for various functions of the image recording device 100.

The voice communication function unit 230 supports a bidirectional voice communication with the call function unit 180 of the image recording device 100. To this end, the voice communication function unit 230 may provide for an operating switch (i.e., a soft switch) which a user of smart phone 200 may operate; and may create a voice output signal with a beep sound by receiving a voice through an embedded microphone corresponding to the operation of the operating switch, and then transfer them to the cloud server 300. Further, if a user ends the operation of the operating switch, the voice communication function unit 230 may transfer a beep sound indicating the ending of a voice output signal and/or an order instructing that the microphone of the image recording device be turned on. In addition, if a user operates an operating switch, the voice communication function unit 230 may also output a beep sound indicating the starting of a voice output signal and/or an order instructing that the microphone of the image recording device be turned off. Of course, said beep sound itself may also perform the function of said order i.e., the image recording device may turn off the microphone at the first beep sound and turn on the microphone at the second beep sound).

Meanwhile, the cloud server 300 may include a function provision database (DB) 310 and an image information database (DB) 320.

The function provision database 310 stores a device unique identifier (ID) and password (PW), etc., for an image recording device 100 intended to have access via any AP by operating in STA mode and stores whether a specific user registered a corresponding device in the cloud server 300. And, if the image recording device 100 is accessed, the work (operation) pre-stored in the corresponding image recording device 100 is performed. That is, for example, the transfer of the image information newly being imaged and stored in the storage unit 130 is requested or the reserved function for the image recording device is activated.

Further, the function provision DB 310 also processes whether or not an access is made to the smart phone 200 intended to have access via an internet. And, it performs the operation requested from an accessible smart phone 200. For example, the function provision database 310 may transfer the image stored in the image information DB 320 to the smart phone; receive in real-time the image information being imaged from the image recording device 100; or transfer any control information to the image recording device 100.

The image information DB 320 may store an image information provided by the image recording device 100 and as needed, provide the image information to any device (for example a smart phone). The image information stored in the image information DB 320 may be encoded with the position information by the GPS function unit 160.

The cloud server 300 may be accessed by a plurality of image recording devices. A user may have access to the cloud server 300 by inputting his/her ID and PW which he/she created by using his/her smart phone 200 and may additionally register a new image recording device in his/her ID. In addition, a user may select an image recording device 100 registered in his/her identifier (ID) among a plurality of image recording devices (including image recording devices of other persons as well as an image recording device which a user registers) which have access to a cloud server and may obtain control over a corresponding image recording device 100. As a result, a user may request a real-time image information from the image recording device 100; request the transfer of the image information stored in the storage unit 130 of the image recording device to the cloud server; request the change of various settings related to the image recording device 100; request the current position information of the image recording device by the GPS function unit 160; or request the implementation of the function of bidirectional voice communication with the image recording device.

Further, the respective image recording devices accessed to the cloud server 300 may determine whether to disclose to other persons the image information provided in real-time.

If any user has access to the cloud server 300, a list of a plurality of image recording devices may be indicated. Then, if the user selects the image recording device in which image information is permitted to be disclosed, among the plurality of image recording devices, the user may see in real-time the image provided by the corresponding image recording device, as well as the image provided by his/her image recording device. For his/her image recording device, each user may set whether the image information being imaged is non-open, completely open, or open to only designated persons (friends), etc.

Meanwhile, if each image recording device 100 is indicated on a predefined map by not using a list form but using a current position information of the each image recording device, a user may select an image recording device 100 located at a desirous position, and may recognize the peripheral traffic flow thereof by watching an image information being imaged by the corresponding image recording device.

Figure 2:
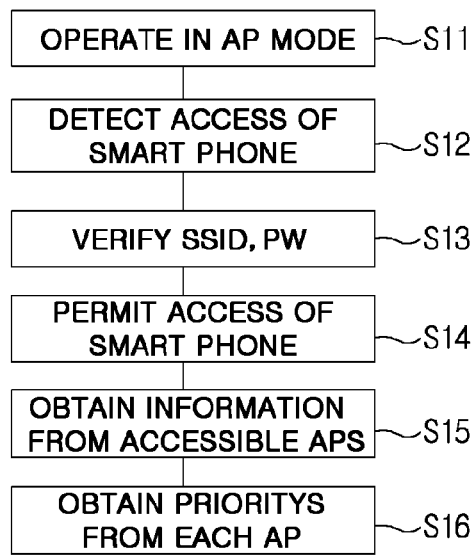
FIG. 2 is a flow chart illustrating an initial setting process of the image recording device according to the present invention for access via Wi-Fi network in a dual mode.

FIG. 2 is a flow chart illustrating an initial setting process of the image recording device according to the present invention which should be defined so as to have access through Wi-Fi network in a dual mode. In the drawing, the processes through which a user intends to initially control an image recording device by means of his/her smart phone are illustrated.

An image recording device 100 is designed to basically operate in AP mode (S11). If the image recording device detects a smart phone requesting an access to the image recording device (S12), it verifies SSID and PW inputted by the smart phone (S13). The image recording device allows or refuses an access from the smart phone 200 in AP mode, depending on success or fail of verification (S14).

If an access to the smart phone 200 is permitted by success of verification, the smart phone 200 can control various settings of the image recording device 100 (S15). That is, the smart phone 200 may input and change various control information for STA function unit 122, including a list about an access point (or a router, etc.) to which the image recording device 100 may have access in STA mode, SSID and/or PW for access to each AP, ID and PW inherent in the cloud server 300 to have access in case of having access to an AP.

Further, if the smart phone inputs a plurality of APs to which the image recording device 100 may have access, the priority for each AP may be set (S16). As a result, if a plurality of accessible APs is searched at the same time, the image recording device 100 is accessed to one specific access point depending on priorities.

As described above, b: making it possible to control the setting for STA mode by the smart phone 200 accessed in an AP mode, a user may also input various settings into an image recording device not having any separate operating device and control these settings, by using the smart phone 200.

Figure 3:
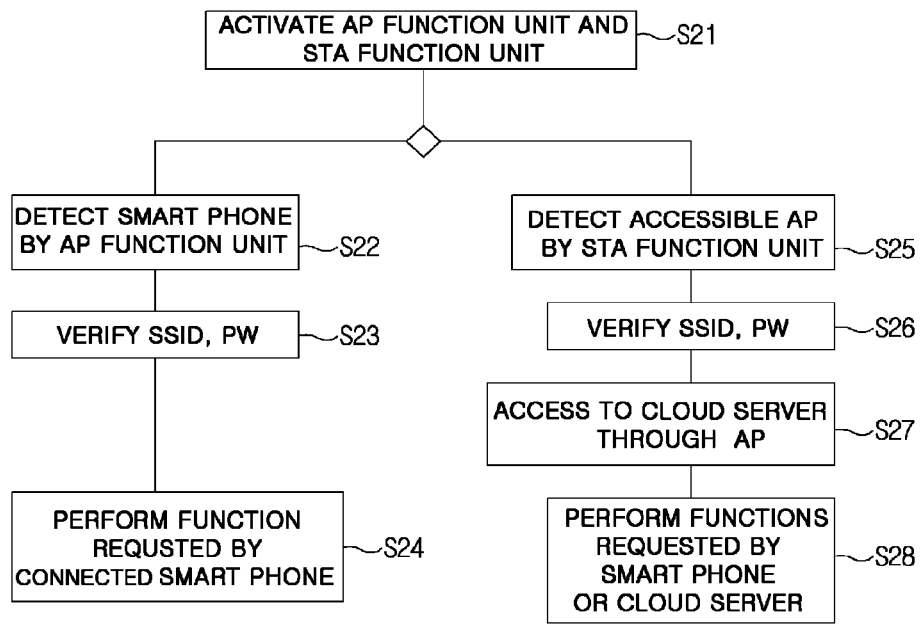
FIG. 3 is a flow chart for describing an access operation of the image recording device according to the present invention via Wi-Fi network in a dual mode.

FIG. 3 is a flow chart for explaining an operation in which the image recording device according to the present invention has access to Wi-Fi network in a dual mode. It is preferable that the image recording device according to the present invention is implemented to process an AP mode and a STA mode at the same time. Or the image recording device preferentially performs the operation in an AP mode. And it may operate in selective mode so that it can have access to the cloud server 300 in a STA mode in case of no access of the smart phone 200 in AP mode.

First, the communicating module 120 of the image recording device 100 activates the AP function unit 121 and the STA function unit 122 at the same time and thereby the AP mode and the STA mode are activated at the same time; the AP function unit 121 waits for an access of the smart phone and, at the same time, STA function unit 122 searches whether an accessible AP exists (S21). If the smart phone 200 requesting an access to the AP function unit 121 exists (S22), the AP function unit 121 requests said smart phone 200 to input SSID and PW and verifies whether the inputted SSID and PW are consistent with preregistered information (S23).

If the verification is passed, the image recording device may determine that said smart phone 200 is a smart phone of a registered user and may receive control information from said smart phone 200 and perform the corresponding function (S24).

Meanwhile, after the AP function unit 121 and the STA function unit 122 are activated in the image recording device, if at least one accessible AP is searched (S25), the image recording device performs a verification by exchanging SSID and PW with the information of the AP having the highest priority (S26).

If the verification is passed, the STA function unit 122 has access to a wireless internet network via said AP and has access to the remote cloud server 300 (S27).

The cloud server 300 may process a preset function if it is accessed to the image recording device 100. Or, the cloud server 300 may also perform an operation requested by the smart phone 200.

Figure 4:
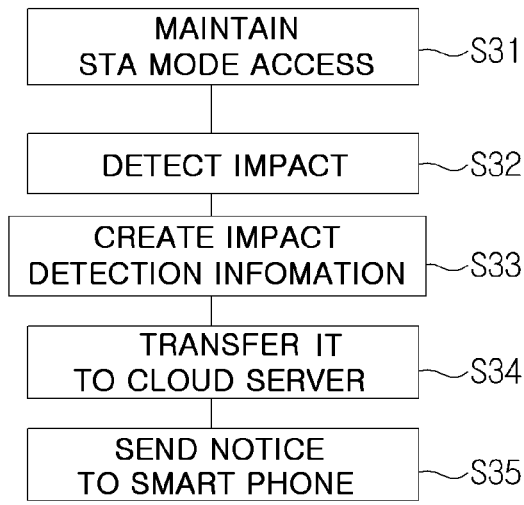
FIG. 4 is a flow chart for explaining one example of additional functions provided by the image recording device, according to the present invention.

FIG. 4 is a flow chart explaining one example of additional functions provided by the image recording device according to the present invention. The image recording device according to the present invention may provide the following additional services by using a G-sensor unit including an acceleration sensor:

First, the image recording device 100 operates in a STA mode and maintains a connection with the cloud server 300 (S31). At this time, if G-sensor unit 170 senses an impact (S32), the image recording device 100 identifies the occurrence of the impact; identifies the current position information; prepares for the image before and after the time when the impact was sensed; and, by combining such information, creates an impact detection information (S33).

The impact detection information will be transferred to the cloud server 300 (S34). Subsequently, the cloud server will send a notice to a smart phone designated by a user (S35). The information designating a smart phone that receives the impact detection information may be preset in the cloud server 300. Or the information designating the smart phone that receives the impact detection information may be stored in the image recording device 100, and the image recording device 100 may send the information with the impact detection information to the cloud server 300.

If a user receives the notice via the smart phone 200, after the user checks information included in the impact detection information, he/she may inform the police station thereof, or take follow-up measures, such as to inquire real-time image information via the cloud server 300.

Further, through such a notice function, the image recording device according to the present invention may also report whether the image recording device had access to the cloud server in STA mode or the access was released.

In addition, the image recording device may also inform a notice of speeding when a vehicle is driving over the predetermined speed.

Furthermore, the image recording device may also inform the cloud server whether to be operated manually and transfer the recorded image. The manual operation is, for example, to record the image manually by operating the image recording device by a user. Also, if malfunction of the image recording device is detected, the image recording device may also inform the cloud server of the malfunctioning situation.

Figure 5:
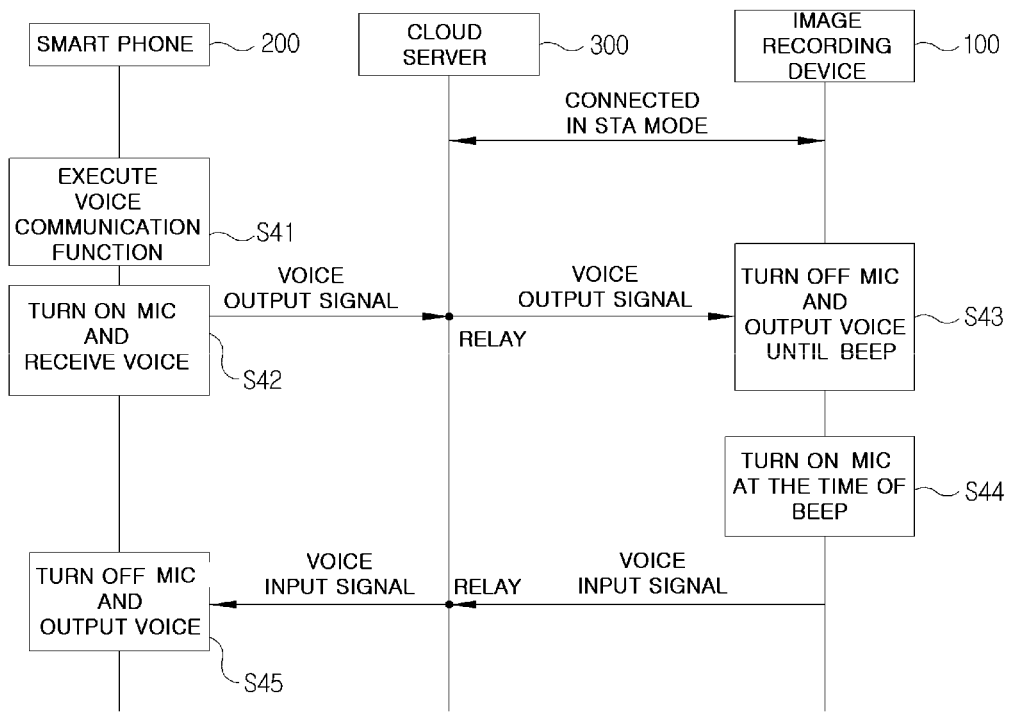
FIG. 5 is a flow chart for explaining one example of the function in which a remote smart phone communicates with the image recording device according to the present invention via a cloud server.

Next, referring to FIG. 5, an example of the voice communication function of a remote smart phone with the image recording device according to the present invention via the cloud server is described.

First, the image recording device 100 is in an access state to the cloud server 300 by operating in STA mode and the smart phone 200 is also in an access state to the cloud server 300.

If the smart phone 200 starts a voice call function (S41), the microphone of the smart phone turns on and a user may input a voice through the microphone (S42). The inputted voice is encoded by being divided per predefined time, thereby converted to a voice output signal. At this time, at the foremost one and/or the rearmost one of the voice output signals may be added a specific signal such as a beep sound or a specific order (to turn off the microphone of the image recording device and start the voice call function).

The voice output signal is transferred to the image recording device 100 via the cloud server 300 per each time. The image recording device 100 turns off the microphone 181 thereof by the receipt of said voice output signal or the identification of a beep sound; and outputs a voice via the speaker 182 by decoding the voice output signal (S43). The microphone 181 maintains an off-state while outputting the voice output signal in sound through the speaker 182.

If a beep sound is detected at the rearmost voice output signal, the control unit 140 of the image recording device may turn on the microphone 181 (S44). As the microphone turns on, the image recording device 100 may also input a voice of a user and create a voice input signal by dividing the inputted voice per said time and encoding each of it. In addition, a specific signal or order such as a beep sound may be added at the foremost and the rearmost of each of the divided voice input signal being encoded.

Of course, it is possible that a voice output signal which a smart phone creates in real-time may also be transferred to the image recording device sequentially without dividing the voice output signal per time as described above.

Meanwhile, a voice input signal may be transferred to the smart phone 200 via the cloud server 300 and due to the voice communication function unit 230 of the smart phone 200 the microphone of the smart phone may turn off and a voice may be outputted.

Meanwhile, according to the present invention, as the cloud server obtains image information and position information from a plurality of image recording devices and maintain these information, various additional services may be provided.

For example, any user may have access to a cloud server through an internet using his/her smart phone or personal computer and inquire about a traffic situation around his/her current position.

Each smart phone may calculate the position thereof by means of the GPS function, with reference to a base station position of a mobile communication network or with reference to information of a repeater's position in an internet communication. Also, the smart phone may designate a radius from its current position; set a specific shape of range; request the cloud server for a list of the image recording devices positioned within a corresponding area; and, if a desired image recording device is selected from the list provided by the cloud server, check in real-time the image information and/or the position information being imaged by a corresponding image recording device.

Inquiry of the traffic situation may also include checking the image information imaged by image recording devices positioned around the smart phone and checking the position information of the peripheral image recording devices. That is, the smart phone may check a traffic situation by checking the image information being imaged in real-time or checking a moving situation or speed of each vehicle.

In addition, the respective image recording devices may be configured to input any desired words (for example "TRAFFIC ACCIDENT AT CURRENT POSITION", "ROADWORK AHEAD") by using any operating means of a user and the words inputted by a user may be transferred to the cloud server. As a result, other users may also check the traffic situation from the image recording device at each position on the basis of these inputted words.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed is:

1. An image sharing system using an image recording device for a vehicle with a Wi-Fi access function comprising:
   a plurality of image recording devices for the vehicle comprising: a imaging unit for creating an image information; a GPS function unit for creating a position information thereof; a communicating module accessing a peripheral AP by functioning as a STATION of a Wi-Fi communication; a storage unit for storing the image information from the imaging unit;
   a microphone for converting a peripheral voice to a voice input signal;
   a microphone control unit for turning on or off the microphone on the basis of the inputted voice output signal; and
   a call function unit with a speaker for converting a voice output signal inputted through the communicating module to a voice and a control unit controlling an operation state thereof according to a control information received from the cloud server by accessing a remote cloud server via a wireless internet communication network;
   a cloud server allowing for access to the plurality of image recording devices via a wireless internet communication network; receiving in real-time the position information and the image information created in real-time from the plurality of image recording devices or receiving the position information and an image information stored in the storage unit; and, according to the request of a smart phone, providing the image information and the position information received from at least one of the plurality of image recording devices to the smart phone; and
   a smart phone requesting the reading of the image information and the position information provided by any image recording device by accessing the cloud server;
   wherein, when the voice output signal is received from the cloud server, the control unit turns off the microphone by the microphone control unit and outputs the voice output signal as a voice through the speaker; and, when the voice output signal ends, the control unit turns on the microphone by the microphone control unit and transfers the voice input signal created from a voice inputted into the microphone, to the cloud server.

2. An image recording device for a vehicle with dual Wi-Fi access function, comprising:
a imaging unit located at any position of a vehicle to create an image information;
a communicating module having an AP function unit which is adapted to function as an AP (access point) of a Wi-Fi communication and a STA function unit which is adapted to function as a STATION of a Wi-Fi communication, thereby allowing for the access to a peripheral AP;
a storage unit for storing the image information from the imaging unit;
a microphone for converting a peripheral voice to a voice input signal;
a microphone control unit for turning on or off the microphone on the basis of the inputted voice output signal; and
a call function unit with a speaker for converting a voice output signal inputted through the communicating module to a voice; and
a control unit configured to allow a specific smart phone as STATION to access the AP function unit, or selectively to allow the STA function unit to access a remote cloud server when it as STATION accesses a peripheral AP; to transfer an image information being imaged in real-time or an image information stored in the storage unit to the smart phone by using the AP function unit or to the cloud server via the peripheral AP by using the STA function unit; to control the operation status thereof according to a control information received from the smart phone by using the AP function unit or from the cloud server by using the STA function unit;
wherein, when the voice output signal is received from the cloud server, the control unit turns off the microphone by the microphone control unit and outputs the voice output signal as a voice through the speaker; and, when the voice output signal ends, the control unit turns on the microphone by the microphone control unit and transfers the voice input signal created from a voice inputted into the microphone, to the cloud server.

3. The image recording device for a vehicle with dual Wi-Fi access function of claim 2,
wherein the control unit is configured to inform the cloud server of whether an access of the STA function unit to the cloud server succeeds; whether a user selects a manual recording function for manually recording the image function; or whether a malfunction occurs in the image recording device.

4. The image recording device for a vehicle with dual Wi-Fi access function of claim 2,
wherein if the smart phone is accessed to the AP function unit,
the control unit receives from the smart phone respective SSID (service set identifier), PW (password) and access priority of accessible one or more APs and stores all these.

5. The image recording device for a vehicle with dual Wi-Fi access function of claim 2,
wherein the voice output signal is divided per a predefined time; and
the control unit allows the voice output signal to be received and decoded and then to be outputted in voice during the time; and if a voice and a specific signal or a specific instruction indicating the end of the voice output signal are identified at the time of decoding, allows the microphone to be turned on after completion of outputting of the voice and allows a voice input signal to be created based on a voice inputted into the microphone.

6. The image recording device for a vehicle with dual Wi-Fi access function of claim 2,
further comprising a G-sensor unit for sensing an acceleration in any direction and outputting an impact signal,
wherein the control unit transfers an impact detection information including at least one of a temporal information sensing an impact, a magnitude and a direction of the sensed acceleration, an image information imaged before and after an impact is sensed, to the cloud server via the STA function unit.

7. The image recording device for a vehicle with dual Wi-Fi access function of claim 2,
wherein the image recording device further comprises a GPS function unit for calculating a position information of the image recording device; and if the position information is inputted, the control unit is configured to transfer in real-time or store the position information in combination with the image information by synchronizing the position information on the basis of a time information of the image information being provided in real-time from the imaging unit.

8. The image recording device for a vehicle with dual Wi-Fi access function of claim 7,
wherein the control unit comprises calculating a moving speed of the vehicle on the basis of the position information and notifying the cloud server by means of the STA function unit if the calculated moving speed exceeds a preset reference speed.

* * * * *